United States Patent
Farmaner et al.

(10) Patent No.: US 8,352,266 B2
(45) Date of Patent: Jan. 8, 2013

(54) SYSTEM AND METHODS FOR IMPROVING ACCURACY OF SPEECH RECOGNITION UTILIZING CONCEPT TO KEYWORD MAPPING

(75) Inventors: Gary Farmaner, Toronto (CA); Ron DiCarlantonio, Tokyo (JP); Huw Leonard, Toronto (CA)

(73) Assignee: Inago Corporation, Toronto, ON (CA)

( * ) Notice: Subject to any disclaimer, the term of this patent is extended or adjusted under 35 U.S.C. 154(b) by 0 days.

(21) Appl. No.: 13/043,282

(22) Filed: Mar. 8, 2011

(65) Prior Publication Data

US 2011/0191099 A1  Aug. 4, 2011

Related U.S. Application Data (63) Continuation of application No. 10/957,579, filed on Oct. 5, 2004, now Pat. No. 7,925,506.

(51) Int. Cl.
G10L 15/00 (2006.01)
G10L 15/26 (2006.01)
G10L 17/00 (2006.01)
G10L 15/04 (2006.01)
G10L 15/18 (2006.01)

(52) U.S. Cl. ........ 704/257; 704/231; 704/235; 704/246; 704/251; 704/252; 704/254; 704/9

(58) Field of Classification Search .................. 704/231, 704/235, 251, 236, 257, 9
See application file for complete search history.

(56) References Cited

U.S. PATENT DOCUMENTS

| | | |
|---|---|---|
| 5,687,384 A | 11/1997 | Nagase |
| 5,797,116 A | 8/1998 | Yamada et al. |
| 5,864,805 A | 1/1999 | Chen et al. |
| 5,903,864 A | 5/1999 | Gadbois et al. |
| 6,009,392 A | 12/1999 | Kanevsky et al. |
| 6,044,337 A | 3/2000 | Gorin et al. |
| 6,064,959 A | 5/2000 | Young et al. |
| 6,188,976 B1 | 2/2001 | Ramaswamy et al. |
| 6,282,507 B1 | 8/2001 | Horiguchi et al. |

(Continued)

FOREIGN PATENT DOCUMENTS

EP  1162602 A1  6/2000

(Continued)

OTHER PUBLICATIONS

Ramos Sanchez, U.; Partial Search Report from corresponding European Application No. 10164674.3; search completed Aug. 23, 2011.

(Continued)

*Primary Examiner* — Paras D Shah (57) ABSTRACT

The invention provides a system and method for improving speech recognition. A computer software system is provided for implementing the system and method. A user of the computer software system may speak to the system directly and the system may respond, in spoken language, with an appropriate response. Grammar rules may be generated automatically from sample utterances when implementing the system for a particular application. Dynamic grammar rules may also be generated during interaction between the user and the system. In addition to arranging searching order of grammar files based on a predetermined hierarchy, a dynamically generated searching order based on history of contexts of a single conversation may be provided for further improved speech recognition. Dialogue between the system and the user of the system may be recorded and extracted for use by a speech recognition engine to refine or create language models so that accuracy of speech recognition relevant to a particular knowledge area may be improved.

31 Claims, 6 Drawing Sheets

U.S. PATENT DOCUMENTS

| | | |
|---|---|---|
| 6,393,398 B1 | 5/2002 | Imai et al. |
| 6,499,013 B1 | 12/2002 | Weber |
| 6,556,970 B1 | 4/2003 | Sasaki et al. |
| 6,601,027 B1 | 7/2003 | Wright et al. |
| 6,721,706 B1 | 4/2004 | Strubbe et al. |
| 6,766,320 B1 | 7/2004 | Wang et al. |
| 7,058,573 B1 | 6/2006 | Murveit et al. |
| 7,184,957 B2 | 2/2007 | Brookes et al. |
| 7,392,189 B2 | 6/2008 | Hennecke et al. |
| 7,447,635 B1 | 11/2008 | Konopka et al. |
| 7,693,720 B2 * | 4/2010 | Kennewick et al. ........... 704/275 |
| 2001/0021909 A1 * | 9/2001 | Shimomura et al. .......... 704/275 |
| 2002/0032568 A1 | 3/2002 | Saito |
| 2002/0087316 A1 | 7/2002 | Lee et al. |
| 2002/0133354 A1 | 9/2002 | Ross et al. |
| 2003/0004722 A1 | 1/2003 | Butzberger et al. |
| 2003/0125948 A1 | 7/2003 | Lyudovyk |
| 2004/0054530 A1 * | 3/2004 | Davis et al. ................... 704/231 |
| 2004/0059575 A1 | 3/2004 | Brookes et al. |
| 2004/0083092 A1 | 4/2004 | Valles |
| 2004/0138885 A1 | 7/2004 | Lin |
| 2005/0049867 A1 * | 3/2005 | Deane .......................... 704/245 |
| 2005/0234723 A1 | 10/2005 | Arnold et al. |

FOREIGN PATENT DOCUMENTS

| | | |
|---|---|---|
| EP | 1320086 A1 | 6/2003 |
| EP | 1324213 A2 | 7/2003 |
| WO | WO 00/51106 A1 | 8/2000 |
| WO | WO 02/086864 A1 | 10/2002 |
| WO | WO 02/089112 A1 | 11/2002 |

OTHER PUBLICATIONS

Giuseppe, R. et al.; "Stochastic Language Adaptation over Time and State in Natural Spoken Dialog Systems"; IEEE Transactions on Speech and Audio Processing; Jan. 1, 2000; p. 4; vol. 8, No. 1; IEEE Service Center; New York, U.S.A.

Ramos Sanchez, U.; Search Report from corresponding European Application No. 10182514.9; search completed Dec. 2, 2010.

Ramos Sanchez, U.; Search Report from corresponding European Application No. 10182546.1; search completed Dec. 3, 2010.

* cited by examiner

SYSTEM AND METHODS FOR IMPROVING ACCURACY OF SPEECH RECOGNITION UTILIZING CONCEPT TO KEYWORD MAPPING

CROSS-REFERENCE TO RELATED APPLICATIONS

The present application is a continuation of U.S. application Ser. No. 10/957,579 filed on Oct. 5, 2004 incorporated herein by reference.

FIELD OF INVENTION

The invention relates generally to the field of speech recognition. In particular, the invention relates to a system and method for improving accuracy of speech recognition.

BACKGROUND OF INVENTION

All modern speech recognition technologies rely on matching user utterances, i.e., spoken words or speeches, to internal representation of sounds and then comparing groupings of sounds to data files of words. The data files may be dictionary files or grammar files.

Dictionary files contain data of sound representations corresponding to individual words. Grammar files contain data of sound representations corresponding to syntactically correct sentence structures. The comparison of the grouping of sounds to the word data may rely on dictionary files, a method commonly referred to as "dictation", or grammar files, a method commonly referred to as "command and control". Typically, either dictionary files or grammar files are used, but not both. In other words, a speech recognition engine tends to use either dictation method or command and control method and rarely mixes these two methods.

When dictionary files are used for pattern matching, groups of sounds are matched against individual words. As individual words are to be matched, the comparison must be made against a large number of sound groupings. In order to be able to identify a match from the large pool, confidence threshold for the comparison tends to be set to a lower value, which generally leads to a lower recognition accuracy.

To improve dictation recognition, a technology called language models may be used. Using this technology, a large number of relevant corpora are first analyzed to generate sophisticated statistical representation of likely sentence construction. The statistical information may include correlation between words, frequency of certain phrases and word patterns or the like. During the process of dictation speech recognition, the statistical information from the language models may be used to weigh matches of group of sounds to groups of words. The additional statistical information permits a threshold higher than that is practical for dictation recognition to be set, thus improving the recognition accuracy.

When creating a language model, relevant corpora, i.e., a collection of written text relevant to a particular knowledge area, may be analyzed. Typically, corpora for creating or establishing language models consist of magazine articles, newspapers or other written material. Once a corpus is compiled, it is often fed to a language model tool or language model generator so that statistical information may be generated from the corpus. However, there tends to be a difference between written expressions and oral expressions. Additionally, there may be a difference between written material and live dialogues. Language models generated from written material therefore may not provide statistical information consistent with spoken language. The recognition accuracy of a conversation tends to suffer as a result.

When grammar files are used, groups of sounds are compared with exact construction of utterances, here generally referred to as grammar rules. Each grammar rule usually contains a fairly limited vocabulary. The small number of words that have to be identified in a grammar rule generally leads to a higher recognition accuracy.

Grammar rules are pattern matching rules that may parse grammatically correct sentences. Grammar rules themselves do not have to be grammatically correct sentences. For example, a grammar rule may have the form

[I|we|you|he|she|they|it]   [like|want|prefer|love]
   [red|blue|yellow|green]

Each pair of brackets represents a placeholder for a word at that position in a sentence. Words enclosed by each pair of brackets are option words that may be selected for that position. The grammar rule shown here may parse correctly the sentences, for example, "I like blue", or "they prefer yellow". Grammar rules permit the construction of a wide range of candidate sentences from a compact representation. Appropriate grammar rules, instead of a large pool of all possible individual candidate words, may be selected for each comparison. As noted, each grammar rule tends to have a far limited number of candidate words. Thus, a relatively higher threshold may be set for a comparison, which generally leads to a higher recognition accuracy.

While the use of grammar files may dramatically reduce the number of candidate words to be matched, i.e., recognized, the construction of grammar rules tends to be tedious and, when created manually, error-prone. For example, each list of option words may require careful consideration during the construction of each grammar rule. When creating grammar rules manually, people may tend not to create grammar rules as complex as possible and as comprehensive as possible by entering as many option words as desirable for each placeholder for all grammar rules. This may limit the range of utterances that may be recognized by a speech recognition engine utilizing these grammar rules. Any errors in the option words entered or omissions of option words from grammar rules may also lead to errors in the recognition result.

In addition, while using grammar files, it is known to direct speech recognition engine to load, i.e., to use, different grammar rules depending on the context of the speech to be recognized. This requires that similar but not identical grammar rules be created for each context that may be anticipated. This may dramatically multiply the task of creating grammar rules manually and tends to make the manual creation of grammar rules even more tedious and error-prone.

While some speech recognition engines may be able to load several different grammar files and arrange them in a hierarchy, i.e., a search sequence, in its search for matches, i.e., search for matches in these grammar files according to a pre-determined sequence, the pre-determined hierarchy may not best suit each actual conversation to be recognized. Additionally, pre-created grammar rules may not be optimally tailored for use by a speech recognition engine in all conversation contexts. It is therefore an object of the present invention to obviate or mitigate the above disadvantages.

SUMMARY OF INVENTION

In a first aspect of the invention, there is provided a speech recognition system for providing a textual output from an audible signal representative of spoken words. The system has a natural language processor for parsing a partially recognized sentence into a sentence type and an associated ordered list of recognized words and unrecognized sound groupings. The sentence type has an associated ordered list of concepts. The system also has a grammar rule generator for expanding each of the concepts in the ordered list of concepts at a location corresponding to one of the unrecognized sound groupings into a plurality of related words, and a speech recognition engine for converting the audible signal to the textual output. The partially recognized sentence corresponds to the audible signal. The speech recognition engine being operatively connected to said plurality of related words for resolving the one of said unrecognized sound grouping.

In a second aspect of the invention, there is provided a system for improving recognition accuracy of an audible signal representative of spoken words. The system has a natural language processor for parsing a sentence in a textual format into an ordered list of keywords, and a grammar rule generator for expanding each keyword of said ordered list into a plurality of related words to obtain a grammar rule from said ordered list of keywords. The audible signal is converted to a textual output by a speech recognition engine. The speech recognition engine is operatively connected to the grammar rule for resolving unrecognized sound groupings in the audible signal into the corresponding spoken words in the textual output.

In a feature of this aspect of the invention, the system may include an editor for preparing concept to keywords mappings, wherein the expansion of each keyword into the plurality of related words corresponds to matching each the keyword to a concept and replacing the concept with keywords using a corresponding concept to keywords mapping. In another feature of this aspect of the invention, the grammar rule has a context designation assigned thereto. In yet another feature of this aspect of the invention, the system is operable to determine a conversation context of the speech, and the speech recognition engine is operable to select the grammar rule if the context designation matches the conversation context.

In another aspect of the invention, there is provided a method of generating a grammar rule for use by a speech recognition engine. The method includes the steps of parsing a sample sentence using a natural language processor into an ordered list of keywords, matching each keyword of the ordered list to a concept using a concept to keywords mapping, and producing the grammar rule from the ordered list by replacing each the concept with a list of keywords using the concept to keywords mapping.

In a feature of this aspect of the invention, the method may include the step of assigning a context designation to the grammar rule. The concept to keywords mapping may further have a context attribute and the context designation assigned to the grammar rule corresponds to the context attribute. In another feature of this aspect of the invention, the method may include the step of preparing a plurality of concept to keywords mappings.

In another aspect of the invention, there is provided a speech recognition method for resolving unrecognized sound groups in a partially recognized speech using concept to keywords mappings and sentence types. Each sentence type has a plurality of associated grammar rules. The grammar rules are expressed in concepts. The method includes the steps of parsing the partially recognized speech using a natural language processor into a pre-determined sentence type and an associated ordered list of recognized words and the unrecognized sound groups, selecting a list of grammar rules associated with the sentence type from a plurality of grammar rules, each grammar rule of the list having a plurality of constituent concepts, each of the constituent concepts corresponding to one of the recognized words and the unrecognized sound groups, for each the unrecognized sound group, merging the corresponding constituent concepts in all the selected grammar rules into a list of concepts, expanding the list of merged concepts using the concept to keywords mappings to produce a list of candidate words, and resolving each the unrecognized sound group using the list of candidate words.

In a feature of this aspect of the invention, the method may include the step of preparing a plurality of concept to keywords mappings prior to the step of expansion. In another feature of this aspect of the invention, the step of selecting the list of grammar rules includes the steps of comparing the partially recognized speech with each of the plurality of grammar rules and discarding any grammar rules that do not match the partially recognized speech. The step of comparing may include comparing sentence types and the step of discarding may include discarding grammar rules that do not have the same sentence type as the partially recognized speech. Further, the step of comparing may include comparing the partially recognized speech with corresponding constituent concepts of each selected grammar rules and the step of discarding may include discarding grammar rules that do not match any recognized words in the partially recognized speech.

In another feature of this aspect of the invention, the method may include the step of determining a conversation context of the partially recognized speech, wherein each of the selected grammar rules further has a context designation and the step of comparing including comparing the context designation with the conversation context and the step of discarding includes discarding grammar rules that do not have the conversation context matching the context designation.

In yet another aspect of the invention, there is provided a method for generating a dynamic grammar file for use by a speech recognition engine to resolve unrecognized sound groups in a speech using concept to keywords mappings and sentence types. Each sentence type has a plurality of associated grammar rules. The grammar rules are expressed in concepts. The method includes the steps of parsing the partially recognized speech using a natural language processor into a pre-determined sentence type and an associated ordered list of recognized words and the unrecognized sound groups, selecting a list of grammar rules associated with the sentence type from a plurality of grammar rules, each grammar rule of the list having a plurality of constituent concepts, each of the constituent concepts corresponding to one of the recognized words and the unrecognized sound groups, for each the unrecognized sound group, merging the corresponding constituent concepts in all the selected grammar rules into a list of concepts, and generating the dynamic grammar rule from the ordered list by replacing each concept of the list of merged concepts with a list of keywords using the concept to keywords mappings.

In a feature of this aspect of the invention, the method may include the step of assigning a context designation to the dynamic grammar rule. In another feature, the concept to keywords mapping has a context attribute and the context designation assigned to the dynamic grammar rule corresponds to the context attribute. In yet another feature, the method may include the step of preparing a plurality of concept to keywords mappings. Further, the step of selecting may include the steps of comparing the partially recognized speech with each of the plurality of grammar rules and discarding any grammar rules that do not match the partially recognized speech. Optionally, the step of comparing may include comparing sentence types and the step of discarding includes discarding grammar rules that do not have the same sentence type as the partially recognized speech. In another feature, the step of comparing includes comparing the partially recognized speech with discarding includes discarding grammar rules that do not match any recognized words in the partially recognized speech.

In yet another feature of this aspect of the invention, the method may include the step of determining a conversation context of the partially recognized speech, wherein each of the selected grammar rules further has a context designation and the step of comparing including comparing the context designation with the conversation context and the step of discarding includes discarding grammar rules that do not have the conversation context matching the context designation.

In another aspect of the invention, there is provided a method of speech recognition. The method includes the steps of preparing a plurality of grammar rules, each of the plurality of grammar rules having a context designation assigned thereto, determining a conversation context of a speech being recognized by a speech recognition engine and recording the conversation context in a context history, if the conversation context corresponds to one of the context designations, assigning a ranking order to the context designation in a search sequence as a function of the context history, and directing the speech recognition engine to search the plurality of grammar rules following the search sequence.

In a feature of this aspect of the invention, the ranking order correlates to how recent the conversation context appears in the context history. In another feature, the ranking order correlates to how frequent the conversation context appears in the context history. In yet another feature, the ranking order correlates to total length of time the conversation context represents in the context history.

In another aspect of the invention, there is provided a method of compiling a corpus for use by a language model generator. The method includes the steps of storing text of user input from a user and response to the user input generated by a knowledge base system in a log file, extracting a thread of conversation between the user and the knowledge base system, the thread of conversation containing literal texts of the user input and the system response, and adding the thread of conversation to the corpus.

In a feature of this aspect of the invention, the method may include the step of recognizing the user input as a speech using a speech recognition engine, wherein the step of storing includes storing text of the recognized speech of the user. In another feature, the system response is extracted from a database of pre-preprogrammed responses. In yet another feature, the method may include the step of preparing a plurality of pre-programmed responses, and adding all the pre-programmed responses to the corpus.

In yet another aspect of the invention, there is provided a method for improving recognition accuracy of a speech recognition system. The speech recognition system has a speech recognition engine for converting audible signal representative of spoken words into a textual output. The method includes the steps selecting a first plurality of concepts, preparing a second plurality of concept to keywords mappings, each concept of said first plurality of concepts having at least one concept to keywords mapping, defining a third plurality of sentence types, each sentence type being associated with an ordered list of concepts, said ordered list of concepts being formed from said first plurality of concepts, providing said first plurality of concepts, said second plurality of concept to keywords mappings and said third plurality of sentence types, together with said associated ordered lists of concepts, to the speech recognition system for resolving unrecognized sound groupings in the audible signal.

In a feature of this aspect of the invention, the method further includes the steps of entering a sample utterance, parsing said sample utterance into a sentence type and an associated ordered list of concepts using a natural language processor, generating a grammar rule from said sentence type and said associated ordered list of concepts using a grammar rule generator, and providing said grammar rule to the speech recognition engine to resolve unrecognized sound groupings in the audible signal.

In a feature of this aspect of the invention, the method further includes the steps of entering a plurality of sample utterances, parsing each of said sample utterances into a sentence type and an associated second ordered list of concepts using a natural language processor, generating a grammar rule from said sentence type and said associated second ordered list of concepts using a grammar rule generator, and providing said plurality of grammar rules to the speech recognition engine to resolve unrecognized sound groupings in the audible signal. In a further feature, the method may include the further steps of providing a text input corresponding to a partially recognized audible signal to a natural language processor, parsing said text input into a second sentence type and an associated ordered list of recognized words and unrecognized sound groupings using the natural language processor, selecting a list of grammar rules associated with the second sentence type from said plurality of grammar rules, each grammar rule of said list having a plurality of constituent concepts, expanding each of said constituent concepts at a location corresponding to one of said unrecognized sound groupings into a plurality of related words, and providing said plurality of related words to the speech recognition engine to resolve the one of said unrecognized sound groupings.

In other aspects the invention provides various combinations and subsets of the aspects described above.

BRIEF DESCRIPTION OF DRAWINGS

For the purposes of description, but not of limitation, the foregoing and other aspects of the invention are explained in greater detail with reference to the accompanying drawings, in which.

DETAILED DESCRIPTION OF EMBODIMENTS

The description which follows and the embodiments described therein are provided by way of illustration of an example, or examples, of particular embodiments of the principles of the present invention. These examples are provided for the purposes of explanation, and not limitation, of those principles and of the invention. In the description which follows, like parts are marked throughout the specification and the drawings with the same respective reference numerals.

The invention relates generally to the field of speech recognition. In particular, the invention relates to a system and method for improving accuracy of speech recognition. In an embodiment, the system is provided with a module for generating grammar rules automatically from sample utterances. The grammar rules may also be created for any pre-selected context. These grammar rules may be used by a speech recognition engine for improving recognition accuracy. The system is also provided with a module for dynamically generating grammar rules tailored for a context of a conversation. The dynamically generated grammar rule or rules may be provided to the speech recognition engine to further identify words in a partially recognized sentence, i.e., to "amplify" the partial recognition. The system may also be used to track the contexts covered by a conversation and dynamically arrange the hierarchy of grammar files to be searched for matches. Conversations, i.e., dialogues, between a user and the system may also be selectively isolated so that a corpus relevant to a particular knowledge domain may be created from the collection of isolated conversations. The corpus so generated may be used to create or refine language models relevant to the particular knowledge domain.

Figure 1:
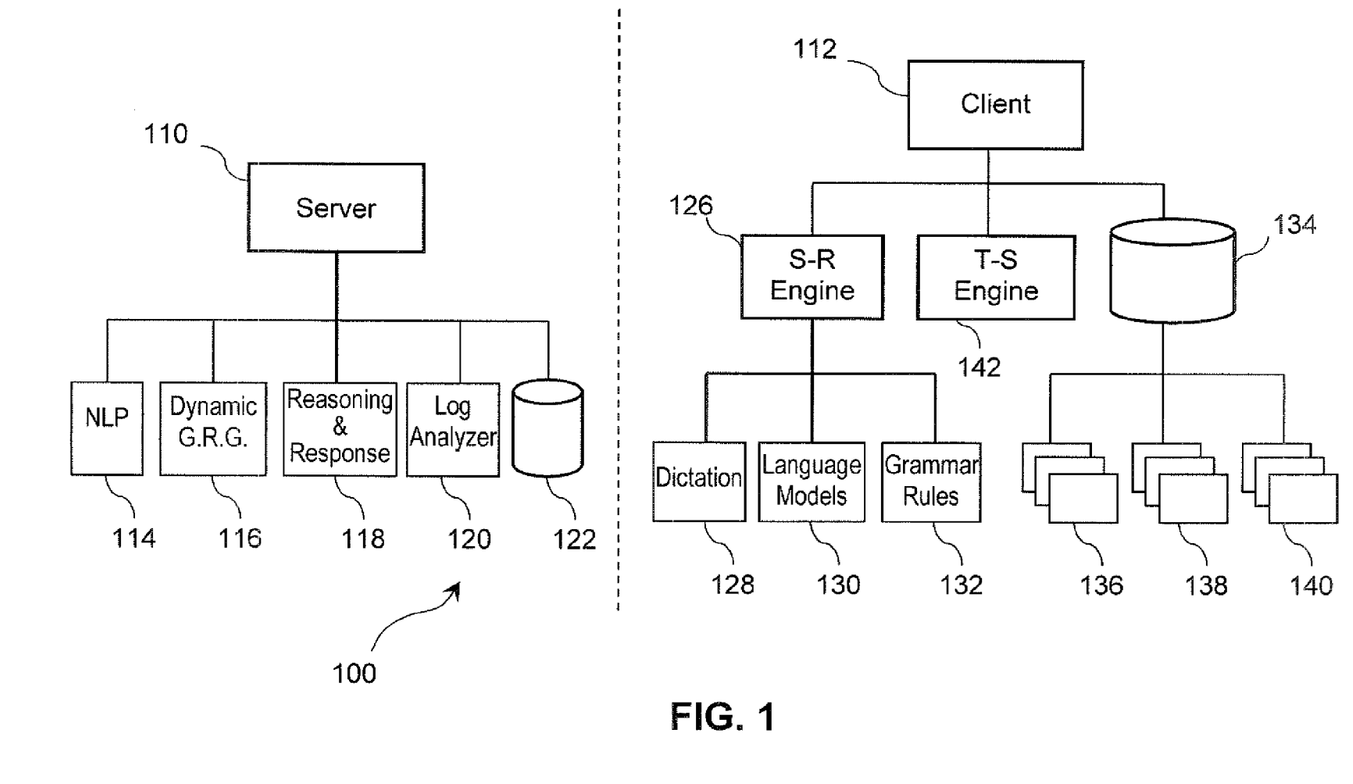
FIG. 1 is a schematic diagram showing a speech recognition system implemented in an exemplary client/server configuration.

FIG. 1 is a schematic diagram showing an exemplary client/server configuration in which system 100 is implemented. To the left of the dotted line is a server portion 110. To the right of the dotted line is a client portion 112. It will be appreciated that although system 100 is divided into a server portion 110 and a client portion 112 in this exemplary configuration, the server and client portions both may be hosted on the same hardware. They may also be executed on the same microprocessor. They may even be integrated into a single software application.

System 100 permits a dialogue between a user and the system. In this configuration, client 112 includes a user interface. Any input received from the user, in the form of utterances, i.e., any audible signal representative of spoken words, or speech, is processed by client 112 to convert to text. Client 112 then sends the converted text to server 110. Server 110 processes the converted text and selects an appropriate response prepared in advance. Server 110 then sends the response to client 112, which may reply to the user either in a speech format or in traditional written text format.

In addition to its I/O units and control units, server 110 has a natural language processor 114 (NLP), a dynamic grammar rule generator 116, reasoning and response module 118, log analyzer 120, and a server database 122 accessible to server 110. Each of these components may correspond to a single process executing on a microprocessor (not shown) or may be a module of a software application implementing server 110. Each of these processes or modules may execute on a single processor or may be distributed over several processors. They may reside in a single local storage media, or may be stored separately in different storage media accessible to a central control module of server 110.

As will be discussed in greater detail later, server NLP 114 processes any text input received from client 112. Server NLP 114 processes its input by parsing the input into a dialogue act, with its associated concept list. The combination of a dialogue act and its associated concept list is called a "trigger", or a signature, or an "event". Each trigger is associated with at least one response. All triggers known to the particular application and their associated responses may be stored in server database 122. Once a matching trigger is found in database 122, the reasoning and response module 118 identifies a response based on the trigger. The identified response is retrieved from database 122 and sent to client 112.

The dialogue act here refers to the type of sentence of the input. For example, a sentence "I like blue" may be represented by a dialogue act STATEMENT-DESIRE whereas a sentence "Is it red" may be represented by a dialogue act QUESTION-INFORMATION. Different dialogue acts such as QUESTION-IDENTITY, QUESTION-LOCATION or STATEMENT-ASSERTION may be defined as needed.

Preferably, dialogue acts are pre-defined in server NLP 114. With pre-defined dialogue acts, server NLP 114 is provided with knowledge or information of how sentences pertinent to each dialogue are constructed. It will be appreciated that dialogue acts may be defined in other parts of the system 100 as well, for example, in the client portion 112, or may be defined at other times, provided that these dialogue acts are defined and accessible to server NLP 114 when server NLP 114 processes an input sentence.

Concepts refer to words that are derived from keywords in the input sentence. Preferably, each concept refers to a group of keywords expressing the same concept or that are considered equivalent in a particular application of the system, as may be defined by a designer of system 100. In other words, each concept maps to a group of keywords that all relate to the same concept, or all are considered equivalent. For example, the sentence "I like blue" may be parsed into three concepts, PERSON, DESIRE and COLOR. The concept PERSON may include the words "I", "we", "you", "he", "she", "they", and "it". The concept DESIRE may include the words "like", "want", "prefer" and "love". Like dialogue acts, how these concepts as well as the mappings to keywords are defined may be determined by needs, such as the context or knowledge domain, or areas of application of system 100. For example, in discussing a corporate structure, PERSON may include "CEO", "chairman" and "president" while in discussing a public transit system, PERSON may include "driver", "station collector" and "passenger".

Certain concepts may be considered to be a fundamental part of a dialogue act. For example, the concept DESIRE may be considered to be fundamental to the dialogue act STATEMENT-DESIRE. Accordingly, when defining the dialogue act, the concept DESIRE may be integrated into the dialogue act. As the concept is now represented by the dialogue act, the concept list needs not to include DESIRE. Accordingly, the corresponding trigger will not include this concept. When the system searches for a matching trigger based on an input sentence as described below, the concept list to be matched will be shorter.

As indicated, each trigger is associated with at least one response. All possible constructions of a sentence from a trigger are considered to be equivalent to each other. How a trigger and its associated responses may be prepared will be described in greater detail later in reference to FIG. 2. Once server 110 receives a user input, it may queue the input in an event queue and process the input when the event reaches the top of the queue; server 110 may also process the input immediately. The reasoning and response module 118 analyses the user input and attempts to find a matching trigger from the collection of triggers stored in server database 122. If a match is found, the reasoning and response module 118 finds from server database 122 all corresponding responses. In case there is only one response, the response is sent to client 112. If multiple responses are found, a response may be selected based on a pre-determined algorithm. The pre-determined algorithm may be simply a random selection of a response from the multiple responses. Alternatively, a more sophisticated algorithm may be employed. For example, if a response has been provided to the user in response to the same user input, a different response may be selected. Or, a response may be selected based on some other conditions relating to the dialogue, the user or the system, such as the context or ambient temperature of the environment of the user detected by system 100. These conditions and algorithms may be programmed into reasoning and response module 118, or may be configured when system 100 is prepared for a particular application.

Dynamic grammar rule generator 116 generates grammar rules dynamically based on partially recognized sentences. Dynamic grammar rules are sent to client 112 for "amplifying" the partial recognition, i.e., to fully resolve the unrecognized words. The process of generating grammar rules dynamically and the use of dynamic grammar rules are more fully described in association with FIGS. 4 and 5.

System 100 provides a log analyzer 120. The purpose and the function of the log analyzer 120 are to extract from the system log file a complete and isolated dialogue between a user and system 100. As will be described in more detail later, dialogues isolated from the system log may be used to create or refine language models to improve the accuracy of speech recognition.

Client portion 112 hosts a software application for interacting with a user. The client software application, or client 112 as will be used interchangeably hereafter, includes a user interface for interacting with the user. The user interface may be an interactive web page, a cell phone, or a navigation system installed in a car. It may also be a software application installed in a personal computer or a computer workstation. The client software application may execute on a local processor, or may execute on the same processor as a server software application. It may be stored locally or may be stored in a remote storage area accessible to the processor executing the agent software application.

Client 112 includes a speech recognition engine 126. Speech recognition engine 126 accepts speech inputs from a user and converts the speech, or utterance of the user, into text. Speech recognition engine 126 may be any generic speech recognition engine prepared by a third party supplier, or a speech recognition engine tailored for the application of system 100.

Speech recognition engine 126 may perform its speech recognition using dictation mode; it may also amplify its result using language model technology or using grammar rules. Speech recognition engine 126 may have separate dictation module 128, language model module 130 and grammar rule module 132. Conveniently, client 112 may also have its own storage media 134 accessible to client 112. Client storage 134 may be used for storing data files, such as dictionary files 136, language model files 138 and pre-created grammar files 140. Grammar files 140 contain grammar rules, generated during the preparation stage, for example, using a toolkit provided by the system, as will be described later.

Grammar files 140 may also contain any context designations associated with individual grammar rules. Context designations may be assigned to grammar rules where the grammar rules are created for the context, or are appropriate for the context. Such grammar files may also be organized in a hierarchy using the context designation based on a pre-determined category hierarchy. For example, separate grammar rules may be created and organized in different grammar files associated with "sports", "ball games", "soccer", "base ball", "chess" and "swimming". These grammar files may be organized in a hierarchy:

When grammar files are grouped by context, speech recognition engine 126 preferably searches grammar files in an optimized sequence in order to reduce recognition time. As noted, different grammar rules may be assigned different contexts to and grammar rules may be grouped together and stored in different grammar files based on their designated contexts. Speech recognition engine 126 would not have to search all grammar files; instead, it may be possible for it to search a subset of grammar rules relevant to the context and still be able to find a correct match. For example, in a discussion of soccer, a search for matches in grammar files may start from "soccer", then in "ball games" and then in "sports". Alternatively, a search may start from "sports", then in "ball games", and finally in "soccer". How each context is ranked determines a search sequence. As will be appreciated, a search sequence may be fixed in a number of ways, for example, built into a custom-made system, fixed by a content designer, or configured by a system administrator. It may also be dynamically determined and customized for a conversation session, as will be described later.

Any result generated by speech recognition engine 126 is sent to server 110. A fully recognized utterance is sent to server 110 as text input so that a response may be returned by server 110, namely, by its reasoning and response module 118. A partially recognized utterance is sent to server 110 so that dynamic grammar rules may be generated by the server's dynamic grammar rule generator 116 for use by speech recognition engine to amplify the partially recognized utterance. Conveniently, client 112 may have a text-to-speech engine 142, for converting to speech any response in text form received from server 110. This may aid the communication between system 100 and the user.

Figure 2:
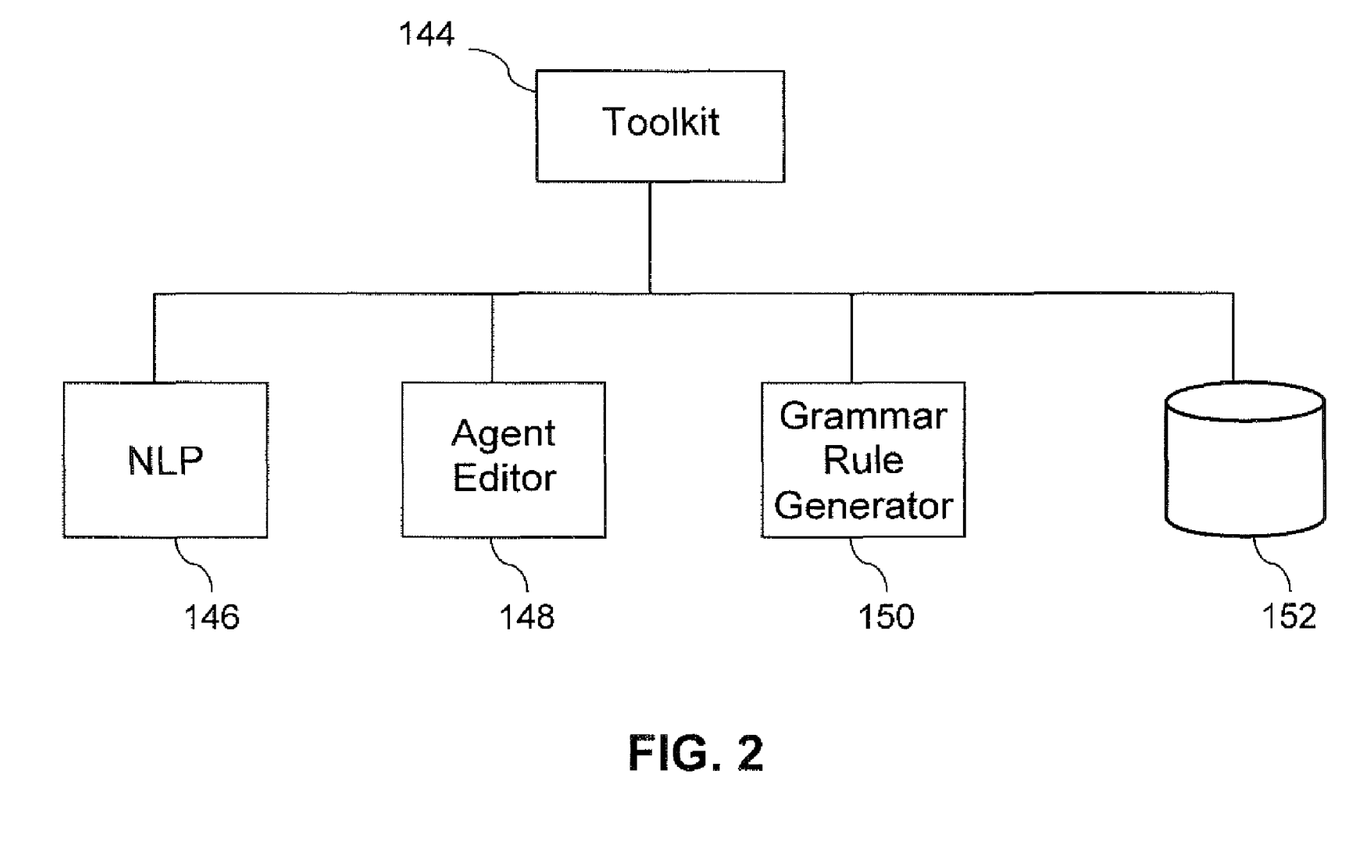
FIG. 2 illustrates schematically functional components of a toolkit for preparing data files for use by the system of FIG. 1.

FIG. 2 shows schematically functional components of a toolkit of system 100 for preparing grammar files and other data files for use by system 100. Conveniently, toolkit 144 includes a toolkit NLP 146, agent editor 148, toolkit grammar rule generator 150, and a toolkit database 152 accessible to toolkit 144.

Toolkit 144 may be used by a system administrator or content creator to prepare system 100 for a particular application. The application may be an automated information system knowledgeable about a public transit system, a particular sport, or a public company, whose stock may be of interests to investors. In this context, the application is called an "agent". In other words, an agent is a particular application of the system, possessing knowledge in a specified area and responding to user inputs in a pre-defined manner.

Agent editor 148 is used to define an agent. A content creator may use agent editor 148 to enter inputs anticipated from a user. Agent editor 148 may also be used to define, or configure, how system 100 responds to input received from client 112. The configuration of an agent may include defining anticipated queries or inputs from a user, or sample utterances or sentences, and one or multiple responses associated with any particular user input. For example, when the content creator creates an agent knowledgeable about sports, the content creator may anticipate a question "What is the score?" The agent may respond with a specific score for a particular game, such as a game played by a local team last night, or the score of a final game of a World Cup Championship match. Both the anticipated question and the corresponding response may be entered by the content creator using, for example, agent editor 148.

An appropriate response to the same question may be different in different context. For example, the final score of a game played by the local team last night may be an appropriate response to the question "What is the score?" in the context of discussing the local team's performance, but may not be appropriate if the context is the World Cup Championship. An appropriate response to a user input therefore may require different information, depending on the context. It is preferable that a context designation is assigned to each anticipated user input and the corresponding response(s), so that an appropriate response may be selected based on the context. Context designations may be entered using agent editor 148.

Toolkit NLP 146 parses, i.e., analyzes and breaks, each anticipated user input into a dialogue act and its associated concept list. As described earlier, a dialogue act is a reference to the type of a sentence. Like dialogue acts for server NLP 114, preferably, these dialogue acts are pre-defined in toolkit NLP 146. Preferably, same set of dialogue acts are pre-defined for both server NLP 114 and toolkit NLP 146.

Each concept is a reference to a group of keywords expressing the same concept, as defined by the content creator, or keywords that are considered equivalent, or at least related, to the concept by the content editor. Mapping from keywords to concepts may also be entered, i.e., defined by content creator using agent editor 148, based on the needs of the knowledge contents to be created.

For example, toolkit NLP 146 may parse the sentence "I like blue" into a dialogue act STATEMENT-DESIRE and a list of three concepts, PERSON, DESIRE and COLOR. Preferably, the pre-defined dialogue act STATEMENT-DESIRE may have the concept DESIRE incorporated into the dialogue act, thus leaving a list of only two concepts. The content creator may use agent editor 148 to include the keywords "I", "we", "you", "he", "she", "they", and "it" in the concept PERSON, for example. As another example, the question "What is the score?" may be parsed into a dialogue act QUESTION-INFORMATION containing a concept SCORE. In a discussion of sports, the concept SCORE may include keywords "score" and "result".

Based on the dialogue acts and the concept lists, a grammar rule may be generated using toolkit grammar rule generator 150 from the sample utterance. Grammar rules so created may be used by speech recognition engine 126 subsequently as pattern matching rules to match any likely sound groupings. The generation of grammar rules is described in full detail in reference to FIG. 3.

The collection of all triggers, corresponding responses, keywords to concept mappings and the grammar rules determines the knowledge domain of an agent. Conveniently, an agent so defined may be "published" to the server, i.e., triggers, responses, and keywords to concept mappings may be stored in server database 122. Grammar rules may be saved in grammar files 140 locally on the client side. If different contexts are assigned to different grammar rules, these grammar rules may be grouped by context designation and stored in different grammar files, each associated with a context designation. Keywords to concept mappings may have separate copies saved in client storage 134 such as in a database and toolkit database 152 as well. It will be appreciated that all information related to an agent may also be stored in a single storage media accessible to server 110, client 112 and toolkit 144.

It will be appreciated that like dialogue acts for server NLP 114, these dialogue acts may be defined at other times as well, provided that these dialogue acts are defined and accessible to toolkit NLP 146 when toolkit NLP 146 processes a sample sentence. In addition, concepts considered fundamental to a dialogue act may be incorporated into the dialogue act, without being listed in the concept list. Further, it is preferred that dialogue acts saved in server database 122 are identical to dialogue acts saved in client storage 134 and that the keywords to concept mappings saved in server database 122 are also identical to that saved in client storage 134.

Figure 3:
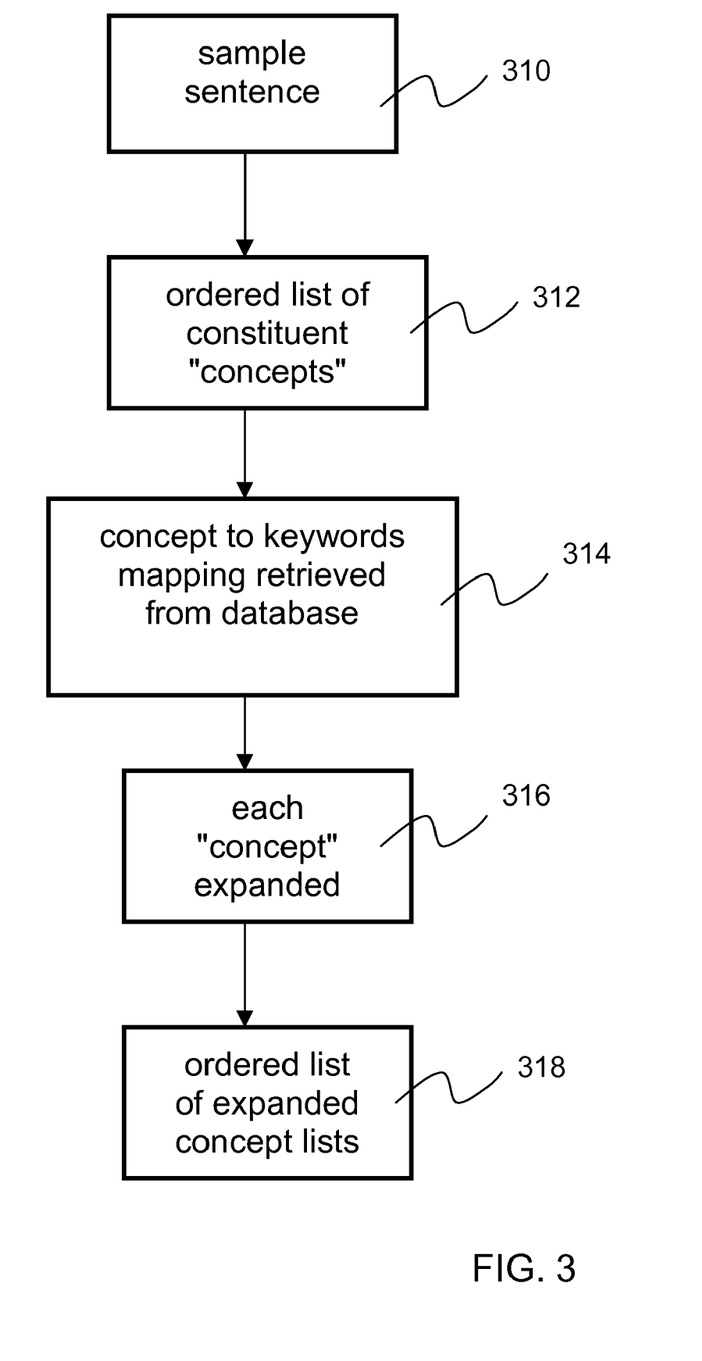
FIG. 3 shows an exemplary process of generating grammar rules for use by the system of FIG. 1.

Referring to FIG. 3, a process of generating grammar rules from anticipated user input, or sample utterance is described. At step 310, the content creator provides a sample utterance using agent editor 148. The sample utterance is processed by toolkit NLP 146 to parse the sentence into a dialogue act and its associated constituent "concepts" at step 312. For example, the sample utterance might be:

I like blue.

In this case, the dialogue act might be STATEMENT-DESIRE and the concept list may include the following constituent keywords:

I, like, blue

Each of these constituent keywords corresponds to a "concept." Toolkit grammar rule generator 150 retrieves from toolkit database 152 the concept to keyword mappings for each of these constituent keywords at step 314. These mappings are used to first match each of the constituent keywords to a concept. As there is a mapping from the keyword to a concept, each of the constituent keywords is also referred to as a constituent "concept" in the following. The same concept to keywords mapping is then used to map the matched concept to a list of keywords. The result is that each constituent keyword is expanded to a list of corresponding keywords (step 316). An ordered list of keyword lists is thus obtained, corresponding to a grammar rule (step 318). If the concept to keyword mapping is defined for a specific context, the grammar rule obtained may be assigned a context designation corresponding to the context. If a generic mapping is used but the grammar rule is generally applicable in a specific context, such as sport, the grammar rule may also be assigned a context designation corresponding to the appropriate context.

For example, the keyword "I" may be mapped to concept PERSON. The content creator may define PERSON to include the keywords "I", "we", "you", "he", "she", "they", and "it", i.e., consider PERSON to be equivalent to these keywords. In other words, the content creator may define that the concept PERSON maps to a list of keywords "I", "we", "you", "he", "she", "they", and "it". Consequently, toolkit grammar rule generator 150 maps, or expands, the keyword "I" to the keyword list "I|we|you|he|she|they|it". Similarly, the keyword "like" may be matched to concept DESIRE which maps to keywords "like", "want", "prefer" and "love". Toolkit grammar rule generator 150 consequently maps, or expands, the keyword "like" to a list of keywords "like|want|prefer|love". Similarly, toolkit grammar rule generator 150 may match keyword "blue" to concept COLOR which corresponds to a keyword list "red|blue|yellow|green". Each of the constituent keywords of the anticipated user input, or sample utterance, is mapped to its corresponding list of keywords. Once each concept is replaced with its corresponding keyword list, a grammar rule is obtained. The grammar rule for the sample utterance:

I like blue.

may thus have the following form:

[I|we|you|he|she|they|it]      [like|want|prefer|love] [red|blue|yellow|green]

The grammar rule so generated provides a much broader representation of the type of input sentence being entered. The broadening of scope occurs at the "concept" level. As each "concept" can be associated with as many keywords as necessary or desirable, the grammar rule generated may be as comprehensive as possible or desirable. In addition, as the expansion of scope occurs at the "concept" level, and the generation of grammar rules is automatic, the grammar rule generated tends to be more consistent than that created manually and tends to be more comprehensive as well. In addition, as the expansion occurs at "concept" level, people tend to be less discouraged to create complex grammar rules, as the assembling of complex grammar rules from concepts is performed by computer.

As described, grammar rules may be generated during the initial stage when a content creator prepares the system for a particular application or agent. Speech recognition engine 126 may use grammar rules to complement its dictation speech recognition.

Figure 4:
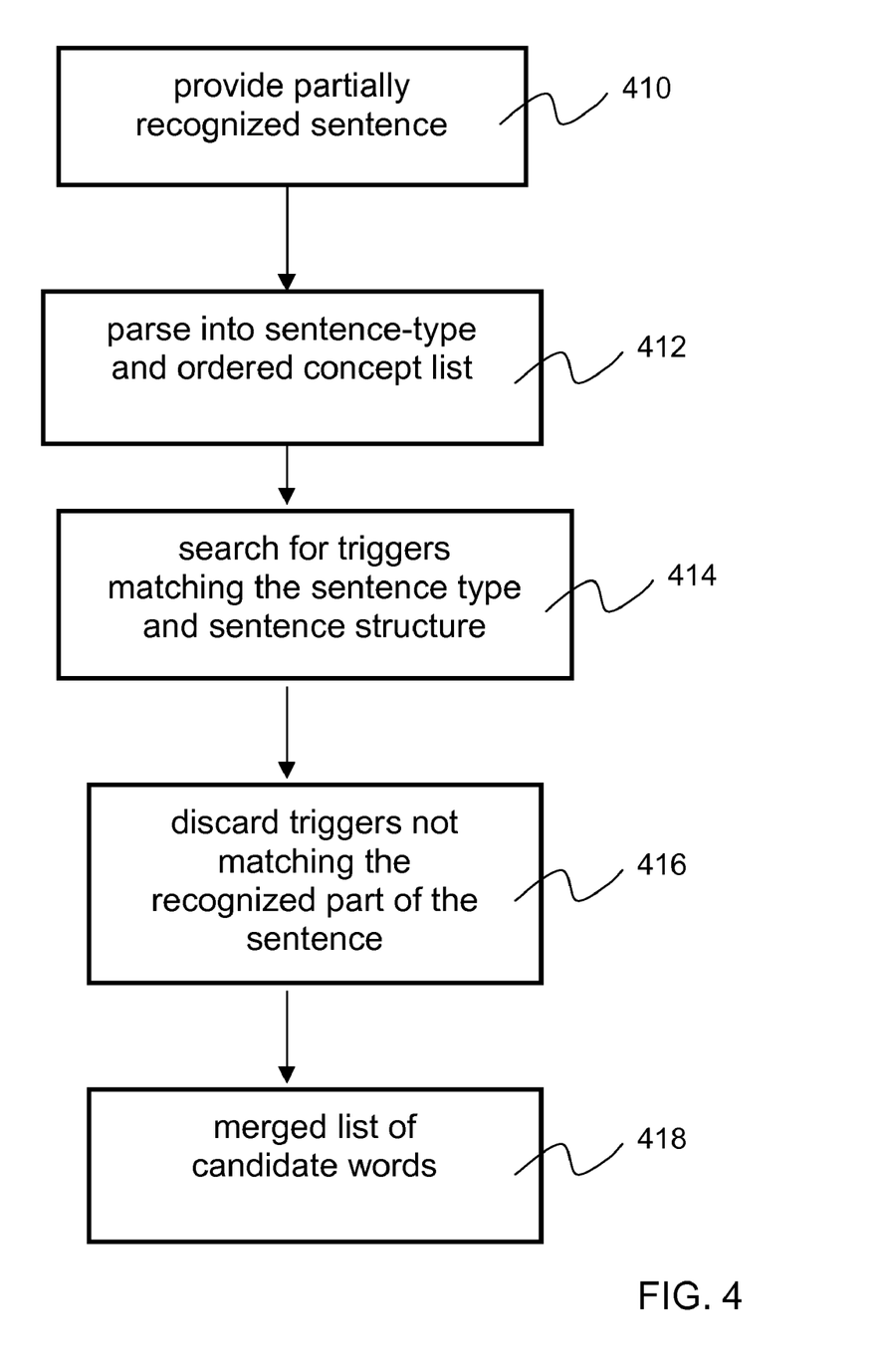
FIG. 4 shows steps of a process of dynamically generating grammar rules for speech recognition and amplification.

Referring to FIG. 4, there is shown a process of dynamically generating grammar rules. Dynamic grammar rules may be used by speech recognition engine 126 to resolve partially recognized utterances and to improve recognition accuracy.

When speech recognition engine 126 is only able to recognize partially a sentence or utterance, the partially recognized sentence or utterance is sent to server 110 (step 410). The sentence structure of the partially recognized sentence is analyzed, i.e., parsed by server NLP 114 to determine its dialogue act type, where possible, and its associated concept list (step 412). In particular, the partially recognized sentence is parsed by server NLP 114 to identify the number of concepts in the partially recognized sentence. In addition, the locations of unrecognized words are also identified during this step. Not all concepts may be resolved, however, because of unrecognized words. Each of the unrecognized words is assigned a placeholder, together with a location index to indicate its location in the partially recognized sentence. For example, the last two words of the following question are not recognized:

What was _ _

This may be recognized as a QUESTION-INFORMATION type dialogue act. Four concepts are identified, with the last two concepts not recognized. The first unrecognized word, represented as a blank "_" above, is placed into a placeholder with a location index "3" to indicate that it is the third word in the sentence. The second unrecognized word, represented as a blank "_" as well, is placed into a placeholder with a location index "4" to indicate that it is the fourth word in the sentence.

Next, at step 414, dynamic grammar rule generator 116 searches in server database 122 for triggers matching this pattern. Triggers that have the same dialogue act type and same sentence structure will be matched at this step. For example, in this case, the dialogue act is QUESTION-INFORMATION. The sentence as may be determined contains four concepts. Thus, server database 122 is searched for all triggers that contain four concepts of the type QUESTION-INFORMATION. The search may produce a list of matched candidates of dialogue acts with their associated concept lists. All matched triggers may be potential candidates.

As mentioned earlier, certain concepts considered fundamental to a dialogue act may be integrated into the dialogue act and not included in the concept list. In this example, the concepts "what" and "is" may be considered so fundamental to a QUESTION-INFORMATION type dialogue act such that they may be extracted from the concept list and integrated into the dialogue act. Accordingly, the type of matched dialogue acts may have only two placeholders, in this case, both corresponding to unrecognized words.

Preferably, at step 416, any trigger that does not match the partially recognized sentence may be discarded. For example, any dialogue act corresponding to "who is the pitcher" would be discarded, as "who is" does not match the recognized words "what was".

The remaining triggers are processed to extract a list of concepts corresponding to the third concepts and a list of concepts corresponding to the fourth concepts, because in this case, the unrecognized words of the input sentence are third and fourth in the sentence. All keywords corresponding to the third concepts are merged to form a single keyword list to replace the first blank of the partially recognized sentence; all keywords corresponding to the fourth concept are merged to form a single keyword list to replace the second blank (step 418). A dynamic grammar rule so generated has the form:

What was [first list of keywords] [second list of keywords]

which may look like:

What was [the|that| . . . ] [score|result| . . . |time|station . . . ]

This grammar rule may contain a large number of candidate words in each of the placeholder corresponding to an unrecognized word. Preferably, the size of the grammar rules may be further reduced by further limiting the matched candidates, i.e., by discarding candidates that likely may not be relevant. Different techniques may be used to discard likely irrelevant candidates. For example, at step 416, triggers that do not have the same context may be discarded. In the context of discussing a soccer game, knowledge about the next station of a train in a public transit system tends to be less relevant and triggers having a context designation of "public transit system" may be discarded without significantly affecting the accuracy of amplification. As described later, the system maintains a context history of the current conversation. Alternatively, triggers that do not correspond to any of the contexts appearing in the context history may be discarded. Similarly, concepts associated with contexts not relevant to the present context likely may not provide a matching word and may be discarded. Again, using the example above, concepts associated with "station" may be discarded without significantly affecting the accuracy of amplification.

Figure 5:
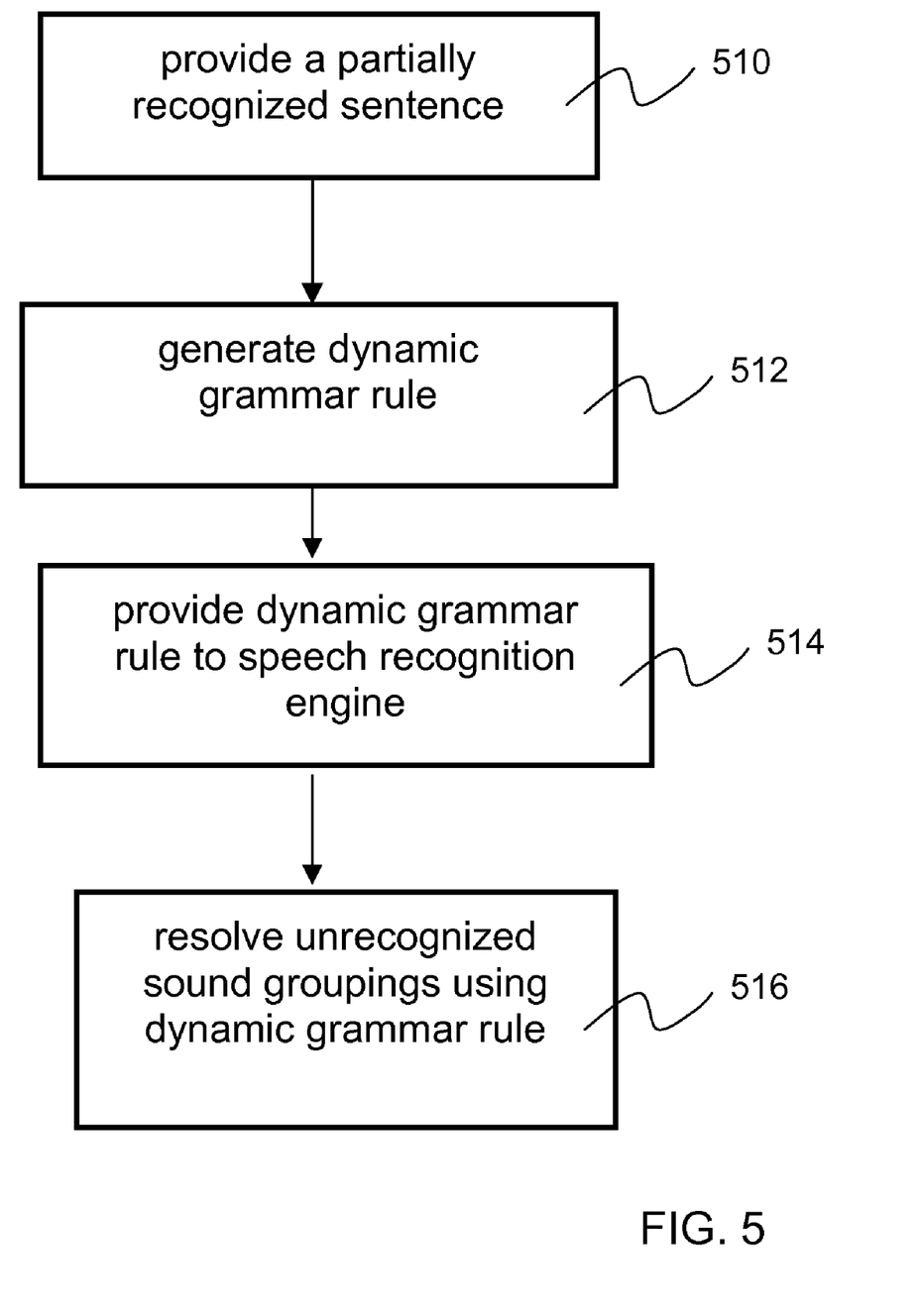
FIG. 5 shows steps of a process of speech recognition amplification utilizing the dynamically generated grammar rules in the process shown in FIG. 4.

One use of dynamically-created grammar rules is to amplify partially recognized speeches, or to fully resolve unrecognized sound groups in a partially recognized speech. Referring to FIG. 5, there is shown steps of a process of the speech recognition amplification utilizing the dynamically generated grammar rule in the process shown in FIG. 4.

For example, while discussing soccer, speech recognition engine 126 is only able to recognize a sentence partially as follows:

What was _ _

The blanks "_" represent words not recognized by speech recognition engine 126. System 100 queues this partial recognition in an event queue of server 110 as a request for amplification. Once server 110 reaches this request in the event queue, the partially recognized sentence is provided to server 110, or server NLP 114 (step 510). Server NLP 114 parses the partially recognized sentence into a dialogue act and associated concept list. Following the steps described in reference to FIG. 4, dynamic grammar rule generator 116 produces a dynamic grammar rule (step 512) in a form, for example:

What was [the|that| . . . ] [score|result| . . . |time . . . ]

This dynamic grammar rule is forwarded to client 112 (step 514). Speech recognition engine 126 may use the dynamic grammar rule to reprocess the partially recognized sentence, i.e., to amplify the partially recognized sentence by comparing unrecognized sound groupings with the last of candidate words (step 516). It will be appreciated that the dynamic grammar rule may be passed to speech recognition engine in different manners. Client 112 may save it as a local file for use by its speech recognition engine 126. Server 110 may also save the dynamic grammar rule on the server side as a temporary grammar file, for speech recognition engine 126 to load remotely. Or, server 110 may simply retain it in the server memory, and direct the speech recognition engine 126 residing on client 112 side to retrieve it from the server's memory.

When a dynamic grammar rule is passed to speech recognition engine 126, preferably, speech recognition engine 126 searches the dynamic grammar rule first to find a match. The dynamic grammar rule is generated from the partially recognized speech and is based on the present context of the conversation between the user and the system. The dynamic grammar rule so generated tends to contain a far limited number of words, as compared with all pre-generated grammar rules pertinent to the contexts of the conversation. Searching dynamic grammar rules first tends to reduce speech recognition time.

As noted, a search sequence of grammar files may be pre-determined for each session of interaction between a user and the system, based on, for example, a hierarchy of contexts assigned to grammar files. Such a pre-determined sequence, however, may not best suit all conversations. System 100 may generate dynamically a search sequence based on the conversation contexts to further improve recognition time and accuracy.

Server 110 may conveniently keep a history of all contexts that have been traced during a conversation. For example, a conversation may start from a generic topic, then switch to weather, then to stock, sports, baseball, and then followed by a discussion about soccer. The context history path would then be general-weather-stock-sports-baseball-soccer. Based on this path, a new hierarchy of grammar files may be established, namely, in the order:

1. Soccer
2. Baseball
3. Sports
4. Stocks
5. Weather
6. General

Figure 6:
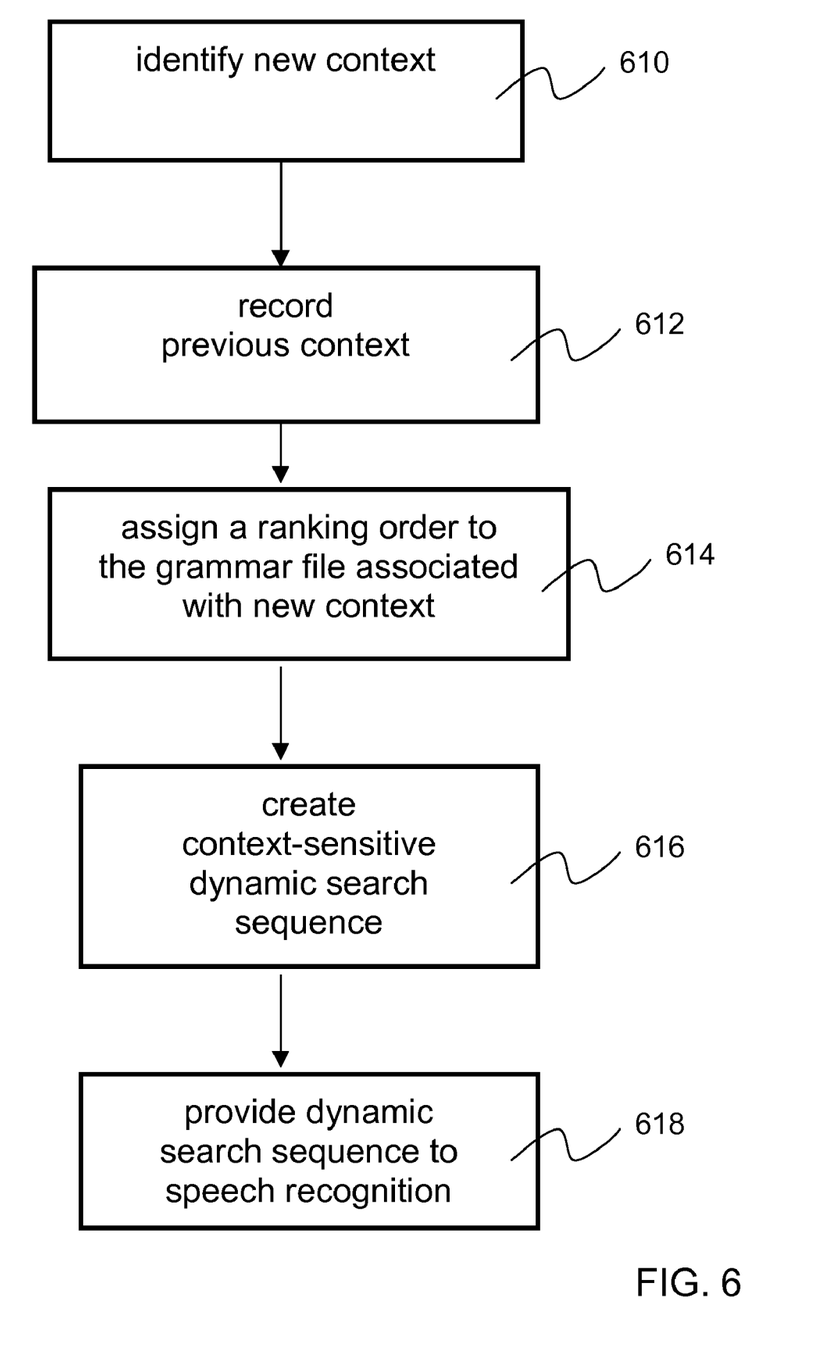
FIG. 6 shows schematically steps of a process of creating a dynamic hierarchy of grammar rules for use by the system of FIG. 1.

Referring to FIG. 6, there is shown schematically a process of creating a dynamic search sequence of grammar rules for use by the system of FIG. 1. During each session between a user and the system, server 110 keeps track of a history of context of the conversation. Each time the reasoning and response module 118 receives a user input, it identifies the context of that input (step 610). If the user input has a context different from that of the previous input, server 110 records the previous context (step 612) and adds this new context to the context history list. Server 110 also assigns a ranking order to the grammar file associated with this context (step 614). This way, a new context-sensitive search sequence of grammar files may be created (step 616). Grammar files are searched following this search sequence, starting from a grammar file that has the highest ranking order to grammar files having lower ranking orders until the grammar file that has the lowest ranking order is searched.

The context-sensitive search sequence may be created based on a variety of algorithms. For example, the ranking order may be assigned simply corresponding to how recent a particular context was discussed. In the example above, the discussion follows the path of general, weather, stocks, sports, baseball, and soccer, with soccer as the most recent context. The search sequence may be to search grammar files associated with soccer first, then grammar files associated with baseball, then sports, then stocks, then weather, and finally a general topic. This hierarchy, or search sequence, may be further modified by the frequency the conversation revisited or length of time the conversation spent in a context. For example, if a particular context has been revisited many times or have been discussed for a long period of time during the same conversation, that context may be promoted to be searched ahead of other contexts or other grammar files despite not being the most recent context.

This dynamic search sequence is passed by server 110 to client 112 for use by the speech recognition engine 126 (step 618). Speech recognition engine 126 uses the dynamic search sequence when searching grammar files for matching sound groups. The dynamically created hierarchy has an advantage of being more relevant to the particular conversation between the user and the system. As can be appreciated, a match may be more likely to be found in the most recent context of the conversation. It may also be more likely to be found in one of the contexts of the conversation. It would, however, be less likely a context unrelated to the conversation. A dynamically created search sequence tends to improve recognition time and accuracy. This also reduces the guesswork that a designer otherwise would have to face when pre-establishing a search hierarchy for all grammar files.

In addition, as mentioned earlier, the context history may also be used to generate dynamic grammar rules. One use is to limit the number of candidates by discarding candidates that may not be likely relevant based on the context history, as described earlier. The other use is to rank the words in a merged word list. As described earlier, a merged word list is produced for each unrecognized word, or sound grouping. The merged word list contains words extracted from keywords in concept to keywords mappings. Words in the merged word list may be ranked based on the dynamic search sequence. Thus, when the dynamic grammar rule is passed to speech recognition engine 126 to re-process the unrecognized sound groupings, more likely candidate words will be searched first for a possible match.

As described earlier, accuracy of speech recognition may be further improved using a technology called language models. Language models are statistical information about sound groupings of patterns in literals.

"Literals" here refers to literal texts, whether spoken or written. The literals provide relevant corpora. The corpora are provided to language model generators to create or refine language models for a specific context or area of "knowledge". It is generally tedious to enter a large pool of literals or relevant corpora for generating relevant statistical information. The system provides a module for compiling literals. In the embodiments described here, the literals include three parts: sample utterances, agent's responses, and user's input.

While sample utterances (and agent responses) may be directly added to the literals, system 100 conveniently provides log analyzer 120 for extracting user input. System 100 may conveniently keep a log of every event and save the system log in a log file. These system events may include, for example, a mouse click, opening of a file, expiry of a timer, or user's speech input and system's responses. Log analyzer 120 analyses the system log and then identifies a thread of conversation from the system log. In other words, log analyzer 120 separates the user input, whether as text input or as text of recognized speech, and the corresponding system response from the system log and group them into threads of conversations. Each thread of conversation would then be a faithful record of the conversation between the user and the system and may be added to the literals or the corpora for creating language models.

For example, a conversation could start with a greeting by the agent, followed by a question from the user and a response generated by the reasoning and response module 118. It then may be followed by a further question from the user, followed by a further response generated by the reasoning and response module 118. Once a separate conversation thread, i.e., a representation of an actual conversation between the user of the system and the response of the system, is extracted from system log, the separate conversation thread may be provided to speech recognition engine 126 or a separate language model generator.

Several advantages may follow from extracting "literals" from system logs. First, it avoids the need of manually entering "literals", a tedious and error-prone process. Second, the log is a more accurate reflection of oral communication between a user and the system, rather than a representation of some written communication, included merely for its relevance to the knowledge area. Third, the literals reflects the real-life inputs from possibly a large number of system users, not the result of creative imagination of perhaps intelligent but a very small number of content creators. The language models created or refined tend to be more accurately reflect real-life conversations, which helps improve the accuracy of speech recognition.

In operation, an administrator or designer of an application of the system first configures the system for a particular application, i.e., defines an agent. As described, an agent is defined by its area of knowledge and its responses to input received from users. In its area of knowledge, the agent "understands" the user input and is able to provide a sensible response. An agent may be defined in a number of ways. Typically, using the toolkit 144 provided, a designer first defines a set of concepts relevant to the area. The designer then uses toolkit 144 or agent editor 148 of toolkit 144 to define a set of concept to keyword mappings for these concepts. Then, the designer enters sample utterances that are considered relevant to the knowledge area. The sample utterances may also correspond to the type of anticipated user input. Toolkit NLP 146 is used to parse each sample utterance into a sentence type, or dialogue act, and the associated ordered concept list, thus defining a trigger. For each trigger, the designer may enter one response, or several responses together with an algorithm for selecting a response from among the several possible responses. When the designer is satisfied that all desirable concept to keywords mappings, triggers and their associated responses are entered, the designer "publishes", i.e., uses toolkit 144 to convert and save the concept to keywords mappings, triggers and their associated responses to the server database 122. This completes the definition or configuration of an agent, i.e., the configuration of the system for a particular application in a specific knowledge area.

To improve the accuracy of speech recognition in this specific knowledge area, speech recognition engine may make use of grammar files. Although grammar files may be created manually, it is preferred to use toolkit 144 to at least partially automate the creation of grammar files. Conveniently, the designer uses toolkit NLP 146 to parse a sample utterance into an ordered list of concepts. Grammar rules can be generated automatically using concept to keywords mappings. The designer may generate grammar rules when a sample utterance is entered and a trigger is generated, or may generate grammar rules when all sample utterances have been entered. These grammar rules are static grammar rules. They tend not to be modified during each session of interaction between an agent and a user, or even across sessions of interaction between the agent and different users. These grammar rules generated automatically using toolkit NLP 146 are stored as one grammar file or several grammar files. Static grammar rules may be grouped and stored as different grammar files according to the grouping. The grouping may be based on category or sub-fields of the knowledge area; it may also be based on a defined "context" as derived from context designation assigned to a grammar rule or assigned to concept to keywords mappings used to generate a grammar rule.

Once an "agent" is "published" and the related grammar files are stored, the system, or the agent, is ready to interact with a user. The system may interact with a user in different manners. In other words, the system may have different types of user interfaces. The user interface may be text based; it may also be speech based. For example, a user interface may be a computer terminal connected to client 112, providing a text input form, or a web-based input form allowing a remote user to enter text queries. A user interface may also be a microphone, or other speech sensing device, coupled to a speech recognition engine 126 so that direct speech input may be entered. A user may initiate a dialogue with the agent by first entering a statement or question through the web-based input form. The user may also directly speak to the agent if the agent is equipped with a speech recognition engine 126. If text input is entered, system 100 will provide a response if the subject matter of the input belongs to the area of knowledge of the agent. If a speech is provided as an input, system 100 first converts the speech to text format using its speech recognition engine 126 and then provides a response based on the recognized speech.

In a system implemented using the client/server configuration of FIG. 1, speech recognition engine 126 on the client side converts a user's speech to text which is then forwarded to the server 110 for processing. If the user's speech is not fully recognized, the partially recognized speech is first forwarded to server 110 for amplification. Server 110's dynamic grammar rule generator 116 generates a dynamic grammar rule based on the partially recognized speech, following the steps described in connection with FIG. 4. The dynamic grammar rule is forwarded to speech recognition engine 126 for use to re-process the partially recognized speech, i.e., to resolve groups of sounds into words that were not resolved in the previous pass of recognition, following steps of the process as described in connection with FIG. 5. If the speech is still not fully recognized, the partially recognized speech, with more words recognized this time, may be sent to server 110 to generate yet another dynamic grammar rule for speech recognition engine 126 to re-process the partially recognized speech again. This process may be repeated until the speech is fully recognized, at which time, the text of the recognized speech is sent to server 110 for selecting a response.

Where the speech is fully recognized, server 110 processes the recognized speech to provide a response. First, the text of the recognized speech is parsed into a sentence type and its associated concept list by server NLP 114, i.e., the text is first converted into a "trigger" by server NLP 114. Server 110's reasoning and response module 118 then finds in server database 122 a match for the input trigger from the collection of triggers "published" to it using toolkit 144. As described, each trigger is associated with a response, or several responses together with an algorithm for selecting a response from these responses. The response associated with the trigger, once selected, is sent back to client 112. Client 112 may display the response to the user in text format or convert it into speech using its text-to-speech engine 142. Meanwhile, system 100 logs the recognized speech and the selected response to the system log.

A context can be determined from the recognized speech and the selected response. It may be determined, for example, from the context designation associated with the matched trigger as assigned by the agent designer. The context may also be determined dynamically from the list of concepts that occur in the user input. For example, if a user input contains several concepts relating to sport and one relating to hockey, the context may be determined to be related to "sport", or one of its sub-category, "hockey". The context is recorded in a context history log if the present context is different from the context associated with the previous user input. The context history may be used by system 100 to formulate a dynamic search sequence for searching, or loading, grammar files, as described in connection with a process shown in FIG. 6. As will be appreciated, the search sequence may be generated by the server or the client, although FIG. 6 shows a process in which server 110 generates the search sequence.

The designer or administrator of the application of the system uses log analyzer 120 to extract individual dialogues from the system log. After an interaction session between the agent and the user is completed or after several such sessions are completed, A "literal" that may be used for establishing or refining language models may be compiled from these separate dialogues. The designer of the agent may provide the literals so compiled to a language model generator to establish language models, if no language model is created yet; or to refine language models, if at least one language model has been established. The designer may, of course, use the collection of sample utterances and designed responses to establish a language model, prior to any interaction session between a user and the agent, as sample utterances and designed responses all belong to the area of knowledge of the agent.

Various embodiments of the invention have now been described in detail. Those skilled in the art will appreciate that numerous modifications, adaptations and variations may be made to the embodiments without departing from the scope of the invention. Since changes in and or additions to the above-described best mode may be made without departing from the nature, spirit or scope of the invention, the invention is not to be limited to those details but only by the appended claims.

What is claimed is:

1. A speech recognition method for resolving unrecognized sound groups in a partially recognized speech using concept to keywords mappings and sentence types, each sentence type having a plurality of associated grammar rules, the grammar rules being expressed in concepts, said method comprising the steps of:

parsing the partially recognized speech using a natural language processor into a pre-determined sentence type and an associated ordered list of recognized words and place holders corresponding to the unrecognized sound groups;

selecting a list of grammar rules associated with the sentence type from a plurality of grammar rules, each grammar rule of said list having a plurality of constituent concepts, each of said constituent concepts corresponding to one of the recognized words and the unrecognized sound groups;

for each said unrecognized sound group, merging said corresponding constituent concepts in all said selected grammar rules into a list of concepts;

expanding said list of merged concepts using the concept to keywords mappings to produce a list of candidate words wherein each of the merged concepts are expandable to a plurality of words conceptually related to each of the expanded concepts and wherein the plurality of words are the list of candidate words; and providing the list of candidate words to a speech recognition engine to enable the speech recognition engine to use the list of candidate words to resolve each said unrecognized sound groups in the partially recognized speech corresponding to the place holders.

2. The speech recognition method of claim 1, further comprising the step of preparing a plurality of concept to keywords mappings prior to the step of expansion.

3. The speech recognition method of claim 1, wherein the step of selecting said list of grammar rules includes the steps of comparing the partially recognized speech with each of the plurality of grammar rules and discarding any grammar rules that do not match the partially recognized speech.

4. The speech recognition method of claim 3, wherein the step of comparing includes comparing sentence types and the step of discarding includes discarding grammar rules that do not have the same sentence type as the partially recognized speech.

5. The speech recognition method of claim 3, wherein the step of comparing includes comparing the partially recognized speech with said constituent concepts of each of the plurality of grammar rules and the step of discarding includes discarding grammar rules that do not match any recognized words in the partially recognized speech.

6. The speech recognition method of claim 3, further comprising the step of determining a conversation context of the partially recognized speech, wherein each of said selected grammar rules further has a context designation and the step of comparing including comparing the context designation with the conversation context and the step of discarding includes discarding grammar rules that do not have the conversation context matching the context designation.

7. A method for generating a dynamic grammar file for use by a speech recognition engine to resolve unrecognized sound groups in a speech using concept to keywords mappings and sentence types, each sentence type having a plurality of associated grammar rules, the grammar rules being expressed in concepts, said method comprising the steps of:

parsing the partially recognized speech using a natural language processor into a pre-determined sentence type and an associated ordered list of recognized words and place holders corresponding to the unrecognized sound groups;

selecting a list of grammar rules associated with the sentence type from a plurality of grammar rules stored by a storage unit on a storage medium, each grammar rule of said list having a plurality of constituent concepts, each of said constituent concepts corresponding to one of the recognized words and the unrecognized sound groups;

for each place holder corresponding to said unrecognized sound group, merging said corresponding constituent concepts in all said selected grammar rules into a list of concepts;

generating the dynamic grammar rule from said ordered list by replacing each concept of said list of merged concepts with a list of keywords a list of candidate words using the concept to keywords mappings stored by the storage unit wherein each of the keywords mapped from the merged concept are expandable to a plurality of words conceptually related to each of the merged concepts and wherein the plurality of words are the list of candidate words; and providing the dynamic grammar rule to the speech recognition engine to enable the speech recognition engine to use the dynamic grammar rule to resolve the unrecognized sound groups in the partially recognized speech corresponding to the place holders.

8. The method according to claim 7, further comprising the step of assigning a context designation to said dynamic grammar rule.

9. The method according to claim 7, wherein said concept to keywords mapping has a context attribute and the context designation assigned to said dynamic grammar rule corresponds to said context attribute.

10. The method according to claim 7, further comprising the step of preparing a plurality of concept to keywords mappings.

11. The method according to claim 7, wherein the step of selecting said list of grammar rules includes the steps of comparing the partially recognized speech with each of the plurality of grammar rules and discarding any grammar rules that do not match the partially recognized speech.

12. The method according to claim 7, wherein the step of comparing includes comparing sentence types and the step of discarding includes discarding grammar rules that do not have the same sentence type as the partially recognized speech.

13. The method according to claim 7, wherein the step of comparing includes comparing the partially recognized speech with discarding includes discarding grammar rules that do not match any recognized words in the partially recognized speech.

14. The method according to claim 7, further comprising the step of determining a conversation context of the partially recognized speech, wherein each of said selected grammar rules further has a context designation and the step of comparing including comparing the context designation with the conversation context and the step of discarding includes discarding grammar rules that do not have the conversation context matching the context designation.

15. A grammar rule generator for use in a speech recognition system, said speech recognition system converting an audible signal representative of spoken words to a textual output from, said speech recognition system comprising a natural language processor for parsing a partially recognized sentence, said grammar rule generator, and a speech recognition engine, said grammar rule generator being configured to generate a dynamic grammar rule from the partially recognized sentence and provide the dynamic grammar rule to the speech recognition engine by:

utilizing the natural language processor to parse the partially recognized speech into a pre-determined sentence type and an ordered list of recognized words and place holders corresponding to unrecognized sound groups;

selecting a list of grammar rules associated with the pre-determined sentence type from a plurality of grammar rules stored by a storage unit on a storage medium, each grammar rule in said list having a plurality of constituent concepts, each of said constituent concepts corresponding to one of the recognized words and the unrecognized sound groups by position in said order list;

for each place holder corresponding to said unrecognized sound group, merging said corresponding constituent concepts in all said selected grammar rules into a list of concepts;

generating the dynamic grammar rule from said ordered list by replacing each concept in said list of merged concepts with a list of keywords a list of candidate words using pre-determined concept to keywords mappings stored by the storage unit wherein each of the keywords mapped from the merged concept are expandable to a plurality of words conceptually related to each of the merged concepts and wherein the plurality of words are the list of candidate words; and providing the dynamic grammar rule to the speech recognition engine to enable the speech recognition engine to use the dynamic grammar rule to resolve the unrecognized sound groups in the partially recognized speech corresponding to the place holders and to convert the audible signal to the textual output.

16. The grammar rule generator of claim 15, the grammar rule generator being further configured to assign a context designation to said dynamic grammar rule.

17. The grammar rule generator of claim 16, wherein said pre-determined concept to keywords mappings have a context attribute and the context designation assigned to said dynamic grammar rule corresponds to said context attribute.

18. The grammar rule generator of claim 15, the grammar rule generator being further configured to compare the partially recognized speech with each of the plurality of grammar rules when selecting the list of the grammar rules and discard any grammar rules from the selected grammar rules that do not match the partially recognized speech.

19. A method of speech recognition for use by a speech recognition engine to resolve unrecognized sound groups in a speech, said method comprising the steps of:

preparing a plurality of grammar rules storing said plurality of grammar rules on a storage medium, each of said plurality of grammar rules having a context designation assigned thereto and comprising an ordered list of concepts, wherein each of the concepts are expandable to a plurality of words conceptually related to each of the expanded concepts;

determining a conversation context of a speech being recognized by a speech recognition engine and recording said conversation context in a context history;

if said conversation context corresponds to one of said context designations, assigning a ranking order to said context designation in a search sequence as a function of said context history; and directing said speech recognition engine to search said plurality of grammar rules following said search sequence and utilize grammar rules identified in said search to resolve unrecognized sound groupings in a speech, wherein each of said identified grammar rules are provided to the speech recognition engine with the concepts in the ordered list of concepts expanded to the plurality of words for use by the speech recognition engine to resolve the unrecognized sound groupings in the speech corresponding to the expanded concepts in the ordered list.

20. The method according to claim 19, wherein said ranking order correlates to how recent said conversation context appears in said context history.

21. The method according to claim 19, wherein said ranking order correlates to how frequent said conversation context appears in said context history.

22. The method according to claim 19, wherein said ranking order correlates to total length of time said conversation context represents in said context history.

23. A computer readable storage medium containing computer program instructions stored thereon, when executed by a processor, causing the processor to perform steps of the method of claim 19.

24. A method for improving recognition accuracy of a speech recognition system, the speech recognition system having a speech recognition engine for converting audible signal representative of spoken words into a textual output and a storage unit, the method comprising the steps of:
selecting a first plurality of pre-defined concepts stored on a storage medium of the storage unit;
selecting a second plurality of pre-defined concept to keywords mappings stored on the storage medium, each concept of said first plurality of concepts having at least one concept to keywords mapping;
selecting a third plurality of pre-defined sentence types stored on the storage medium, each pre-defined sentence type being associated with a pre-arranged ordered list of concepts, said pre-arranged ordered list of concepts being formed from said first plurality of pre-defined concepts, each of the concepts in the pre-arranged ordered list of concepts being expandable to a plurality of words that is conceptually related thereto;
providing said first plurality of pre-defined concepts, said second plurality of pre-defined concept to keywords mappings and said third plurality of pre-defined sentence types, together with said associated pre-arranged ordered lists of concepts, to the speech recognition engine of the speech recognition system to enable the speech recognition engine to use said first plurality of concepts, said second plurality of pre-defined concept to keywords mappings, said third plurality of sentence types, and said associated pre-arranged ordered lists of concepts to resolve unrecognized sound groupings in the audible signal, wherein each of the concepts in the ordered lists of concepts are expanded to the plurality of conceptually related words for use by the speech recognition engine to resolve the unrecognized sound groupings in the speech corresponding to the expanded concepts in the ordered list.

25. The method of claim 24, further comprising the steps of:
entering a sample utterance;
parsing said sample utterance into a sentence type and an associated ordered list of concepts using a natural language processor;
generating a grammar rule from said sentence type and said associated ordered list of concepts using a grammar rule generator; and
providing said grammar rule to the speech recognition engine to enable the speech recognition engine to use said grammar rule to resolve unrecognized sound groupings in the audible signal.

26. The method of claim 24, further comprising the steps of:
entering a plurality of sample utterances;
parsing each of said sample utterances into a sentence type and an associated second ordered list of concepts using a natural language processor;
generating a plurality of grammar rules each from a respective one of said plurality of sentence types and a respective one of said plurality of associated second ordered lists of concepts using a grammar rule generator; and
providing said plurality of grammar rules to the speech recognition engine to enable the speech recognition engine to use said plurality of grammar rules to resolve unrecognized sound groupings in the audible signal.

27. The method of claim 26, further comprising the steps of:
providing a text input corresponding to a partially recognized audible signal to a natural language processor;
parsing said text input into a second sentence type and an associated ordered list of recognized words and unrecognized sound groupings using the natural language processor;
selecting a list of grammar rules associated with the second sentence type from said plurality of grammar rules, each grammar rule of said list having a plurality of constituent concepts;
expanding each of said constituent concepts at a location corresponding to one of said unrecognized sound groupings into a plurality of related words; and
providing said plurality of related words to the speech recognition engine to enable the speech recognition engine to use said plurality of related words to resolve the one of said unrecognized sound groupings.

28. A method of generating a grammar rule for use by a speech recognition engine, said method comprising the steps of:
parsing a sample sentence using a natural language processor into an ordered list of keywords that matches a pre-arranged ordered list of keywords stored by a storage unit on a storage medium, the pre-arranged ordered list being associated with a pre-defined sentence type;
matching each keyword of said ordered list to a concept using a concept to keywords mapping, wherein each of a respective matched concept is expandable to a plurality of words conceptually related thereto; and
producing the grammar rule from said ordered list by replacing each said concept with a list of keywords using the concept to keywords mapping each keyword of the ordered list with the plurality of words that is conceptually related to the respective matched concept,
wherein said grammar rule is to be provided to the speech recognition engine for the speech recognition engine to use the plurality of words in said grammar rule to resolve unrecognized sound groupings in a speech corresponding to the replaced keywords in the ordered list of keywords.

29. The method according to claim 28, further comprising the step of assigning a context designation to said grammar rule.

30. The method according to claim 28, wherein said concept to keywords mapping has a context attribute and the context designation assigned to said grammar rule corresponds to said context attribute.

31. The method according to claim 28, further comprising the step of preparing a plurality of concept to keywords mappings.

* * * * *